United States Patent [19]

Karinthi

[11] Patent Number: 5,315,163
[45] Date of Patent: May 24, 1994

[54] ANALOGIC NEURONAL NETWORK

[75] Inventor: Pierre Karinthi, Jouy en Josas, France

[73] Assignee: L'Air Liquide, Societe Anonyme pour l'Etude et l'Exploitation des Procedes Georges Claude, Paris, France

[21] Appl. No.: 21,077

[22] Filed: Feb. 23, 1993

[30] Foreign Application Priority Data

Feb. 28, 1992 [FR] France ................... 92 02352

[51] Int. Cl.⁵ .................... H03K 19/195; H03K 17/92
[52] U.S. Cl. ....................................... 307/201; 395/24; 307/476; 307/245; 307/306
[58] Field of Search ............... 307/306, 245, 277, 201; 395/24

[56] References Cited

U.S. PATENT DOCUMENTS

| | | | |
|---|---|---|---|
| 3,717,773 | 2/1973 | Parmentier et al. | 395/24 |
| 4,904,882 | 2/1990 | Szu | 307/245 |
| 5,111,082 | 5/1992 | Harada | 307/476 |
| 5,229,655 | 7/1993 | Martens et al. | 307/245 |

FOREIGN PATENT DOCUMENTS 2105306  8/1971  Fed. Rep. of Germany.

*Primary Examiner*—Edward P. Westin
*Assistant Examiner*—Benjamin D. Driscoll
*Attorney, Agent, or Firm*—Young & Thompson

[57] ABSTRACT

The network comprises cells each constituted by a first channel (4, 4') of a material having selectively a superconductive state and a resistive state, refrigeration apparatus to maintain the first channel at a temperature below that which ensures superconductivity of the material below a critical current intensity in the channel, an electrical supply for the channel, and a second channel (5) branched in parallel to the first and having an electrical resistance (R). According to the invention, the two cells are coupled by at least one interconnection channel (8, 9, 10, 11; 8', 9', 10', 11') with unidirectional electrical conduction, extending from the input of one cell to the input of the other cell to input current into this latter or to derive it, a voltage control regulating the intensity of the current flowing from one cell toward the other in the interconnection channel.

13 Claims, 3 Drawing Sheets

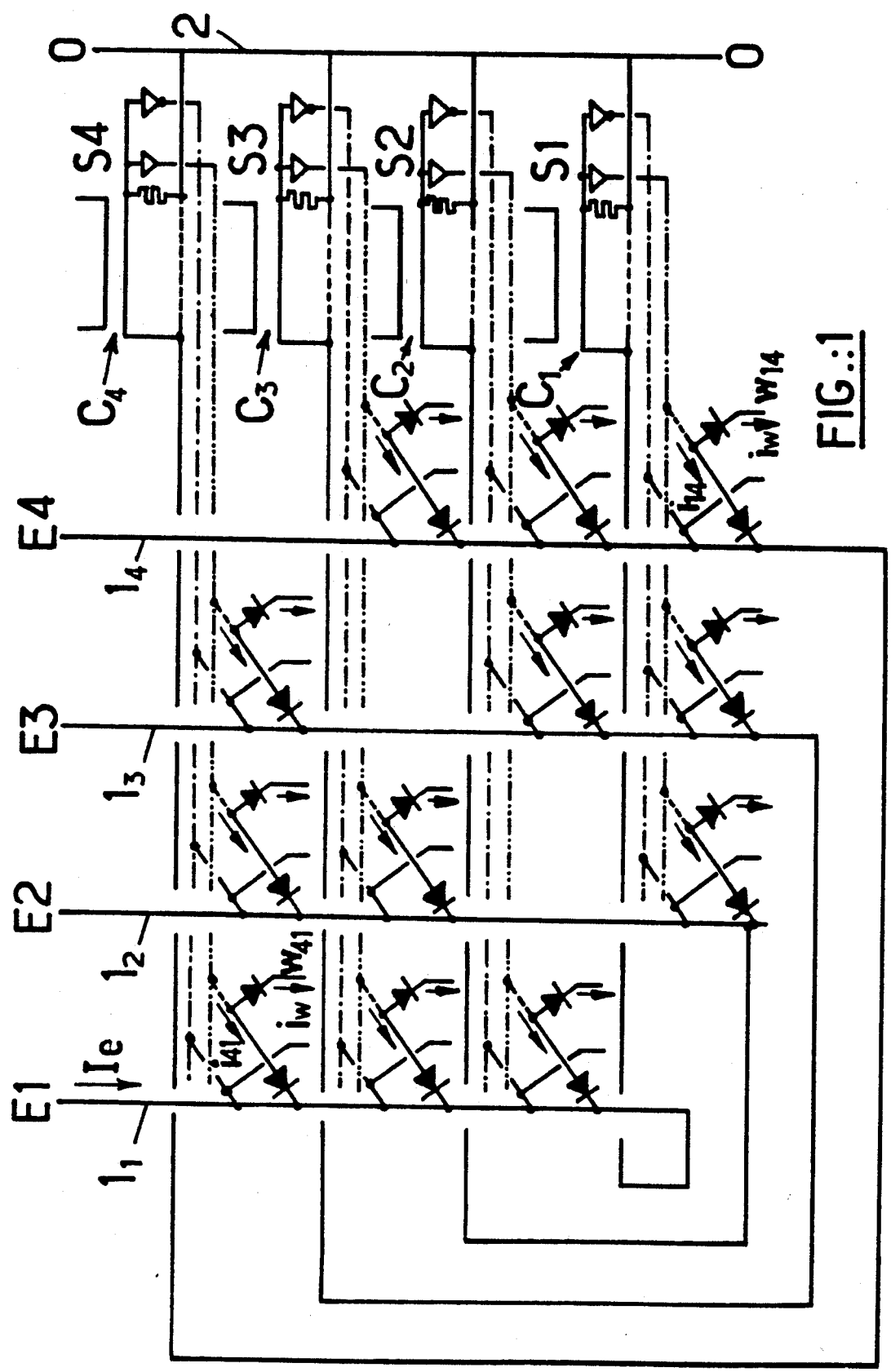

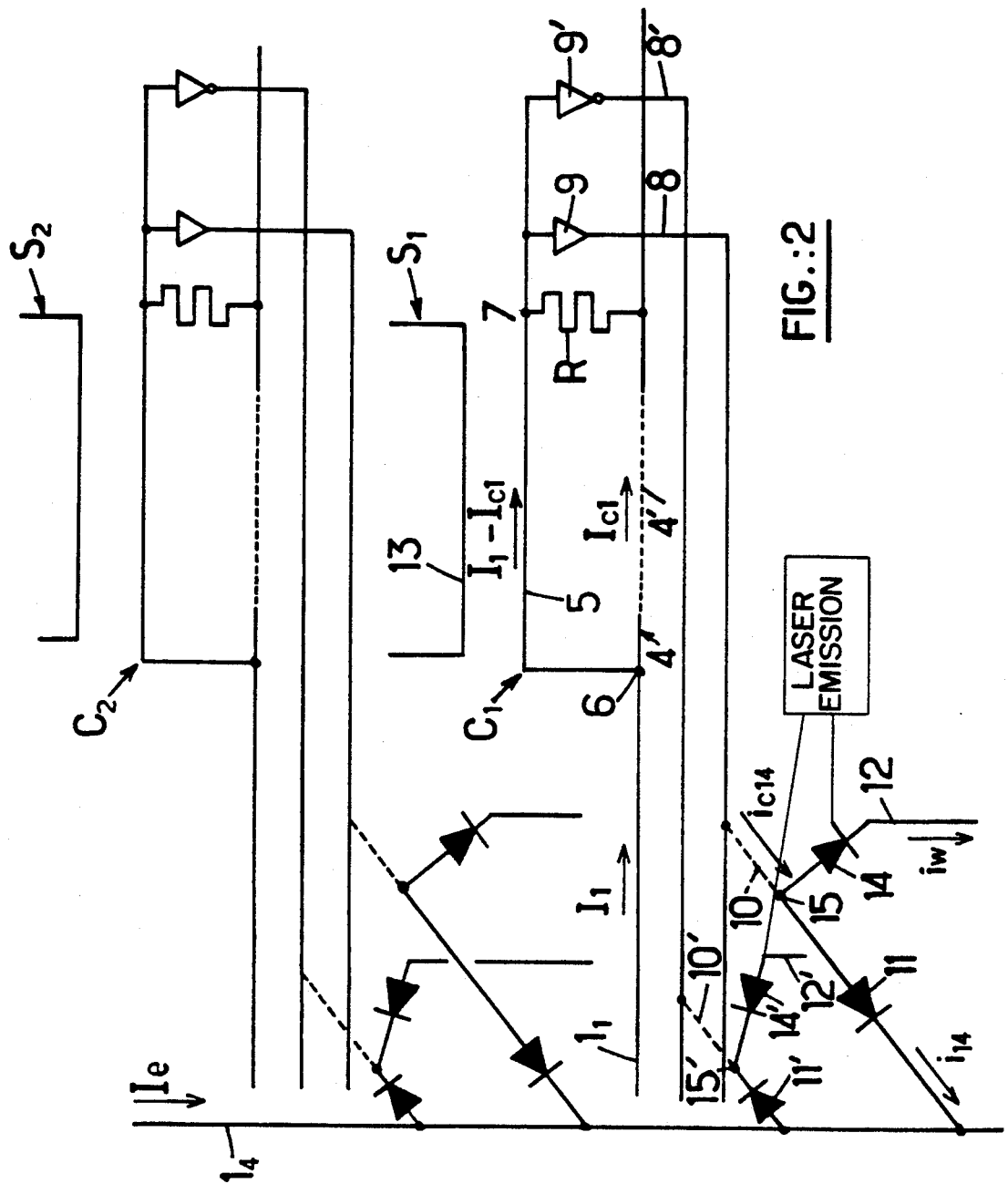
FIG.:2

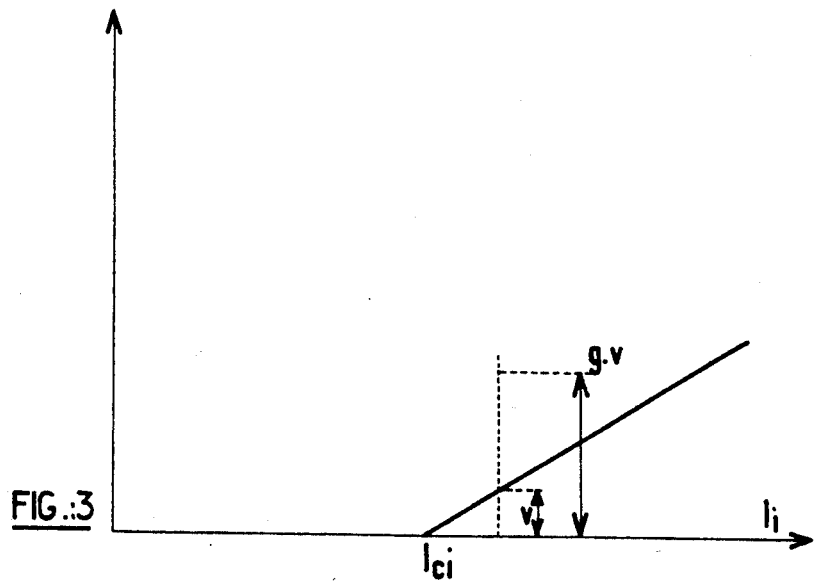
FIG.:3
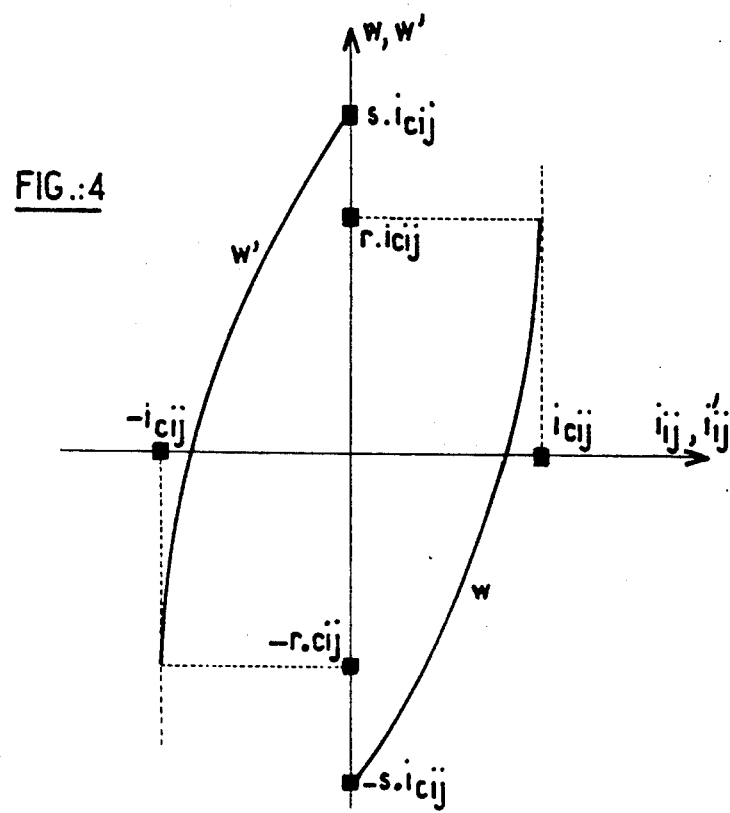
FIG.:4

ANALOGIC NEURONAL NETWORK

The present invention relates to a formal network of neurons called a "neuronal" network and, more particularly, to such a network of the analogic type, constituted by cells or "neurones" assembled about an element and in a superconductive material.

There is known from European patent application No. 91403211.5 filed Nov. 27, 1991 by the applicant, an electrical commutation cell utilizable in such a network. This cell comprises a first channel of a material having a superconductive state and a resistive state, refrigeration means to maintain said first channel at a temperature below that at which superconductivity of the material is assured below a critical current intensity in the channel, electrical supply means for said channel, and means to adjust the intensity of the electrical current flowing in the channel so as to establish the channel selectively in its superconductive state or its resistive state. The cell comprises moreover a second channel of a material conducting electricity, connected in parallel to the first channel so that the voltage at the terminals of this second channel will be substantially zero when the first channel is in its superconductive state and not zero when the first channel is in its resistive state.

Such a cell permits assembling a formal neuronal network. It is known that such a network is constituted of cells that are partially or completely interconnected, the state of each cell being a function of that of the cells with which it is interconnected, the influence of each of these cells being moreover characterized by a coefficient, termed synaptic load, applied to the signal received from an emitting cell.

It is also known that the neuronal networks must be subjected to "apprenticeship". By way of illustration and not limitation, such apprenticeship could consist in presenting to the input of the network various expressions, sonic or optical for example, of a same entity, the synaptic loads then adjusting themselves progressively such that the output of the network displays an identification unique to this entity, no matter what the particular expression of the latter presented at the input of the network. It is thus that a neuronal network may be caused to recognize a letter or a digit, no matter what its written expression, variable from one person to the next. At present this apprenticeship is effected principally by means of an "adjoint" computer simulating the network and proceeding itself to the necessary adjustment of the synaptic loads. This "numerical" technique permits a fine adjustment of these loads but has the considerable disadvantage of consuming a great deal of computer time and therefore being both slow and costly.

To overcome this disadvantage, there have been conceived "analogic" networks in which the synaptic loads adjust themselves directly and thus more rapidly and at least cost. As an example of such networks, could be sighted those described by Hopfield, particularly in the article entitled "Neural networks and physical systems with emergent collective computational abilities", in the review "Proceedings of the National Academy of Sciences of the USA", Vol. 79 (1982) pp. 2554 to 2558.

The Hopfield networks comprise an arrangement of cells in several layers, the excitations of these cells by each other taking place according to the "retropropagation" principle, which is to say in both directions between two cells of the network.

In the examples of networks described by Hopfield, however, the synaptic loads are represented by conductances. However, in the actual state of the art, it is not known how to regulate these conductances with sufficient precision that such a network could identify, for example, a non-elemental design target. It is known how to define the conductance at better than 32 levels (which is to say 5 bits) while in such an application, it would be necessary to achieve 1000 levels (10 bits).

SUMMARY OF THE INVENTION

The present invention therefore has for its object to provide an analogic neuronal network of the type described above and improved so as to permit the adjustment of the synaptic loads of the network with higher precision.

The present invention also has for its object to provide such a network which will be comprised by repeating elements permitting easy embodiment of this network.

The present invention also has for its object to provide such a network consuming a very small quantity of energy.

These objects of the invention are achieved, as well as others which will become apparent from a reading of the description which follows, by an analogic neuronal network of the type comprising at least two electrical commutation cells each constituted by a first channel of a material having selectively a superconductive state and a resistive state, refrigeration means to maintain said first channel at a temperature below that which ensures superconductivity of the material and below a critical current intensity in the channel, electrical supply means for said channel, and means to adjust the intensity of the electrical current flowing in this channel to establish it selectively in its conductive state or its resistant state, and a second channel branched in parallel to the first and having an electrical resistance. According to the invention, the two cells are coupled by at least one interconnection channel extending from the input of one cell to the input of the other cell to introduce current into this latter or to derive it, control means of the voltage being provided to adjust the current intensity flowing from one cell toward the other in the interconnection channel.

Thanks to the use of voltage control means of the current flowing in the interconnection channel, current embodying a synaptic load in the sense defined above, this load can be very precisely adjusted because the present technology offers means for adjusting voltage very finely. It is thus known for example now to adjust the voltage by better than 1/100,000, namely a precision of the order of 17 bits, substantially greater than that which is actually desired for computers with neuronal networks.

The network according to the invention preferably comprises two interconnection channels with unidirectional conduction operating in parallel between two cells of the network, these channels being each associated with voltage control means for the intensity of current flowing in each channel, unidirectional conduction means being provided so that the two currents thus established will flow in opposite directions between the two cells.

According to other characteristics of the network according to the invention, said unidirectional conduction means are diodes and the two interconnection channels are supplied by positive and negative voltage amplifiers, respectively, whose inputs are connected to the input of the second resisting channel of a cell. Each interconnection channel comprises a superconducting portion so dimensioned as to transmit a current of critical intensity, under the electrical and temperature conditions of supply established for each channel.

According to another essential characteristic of the neuronal network according to the invention, the voltage control means associated with each interconnection channel comprise each a line connected to the interconnection channel between the superconducting portion of the channel and the diode disposed in the channel, to introduce into one channel, or to derive from the other, a current of predetermined intensity established by these means. It is thus possible to regulate with great precision the current intensity flowing in each channel and therefore the synaptic loads of the cells of the network.

Other characteristics and advantages of the present invention will become apparent from a reading of the description which follows and from a study of the accompanying drawings.

BRIEF DESCRIPTION OF THE DRAWINGS

FIG. 1 shows schematically an analogic neuronal network according to the present invention, FIG. 2 shows in greater detail a cell of the network of FIG. 1, FIG. 3 is a graph of observed voltage at the terminals of a cell of the network according to the invention, and FIG. 4 is the graphs of voltages and currents observed in the two-interconnection channels of two cells of the network according to the invention.

DETAILED DESCRIPTION OF THE PREFERRED EMBODIMENT

Reference will now be made to FIG. 1 of the accompanying drawings in which is shown, by way of illustrative example without limitation, a neuronal network according to the invention constituted by only four completely interconnected cells. This very simple example of a network according to the invention permits describing clearly and completely the structure and the function of the means used to adjust the synaptic loads between cells. It will be clear however that the invention is applicable to much more complicated networks comprising for example a large number of cells distributed in several layers, according to the arrangement described by Hopfield, for example.

The illustrated network comprises four cells $C_1$, $C_2$, $C_3$, $C_4$ connected to inputs $E_1$ to $E_4$ respectively of the network by lines $1_1$ to $1_4$ respectively, which are preferably of a material which is and remains superconductive at the temperature at which the network is maintained by refrigeration means (not shown) no matter what the intensity of the current which passes through these lines. These lines $1_1$ to $1_4$ are connected, through the cells $C_1$ to $C_4$, respectively, to a line 2 of zero voltage. The inputs $E_1$ to $E_4$ can be supplied selectively with a current of intensity $I_e$ to energize the cells. In the enlarged representation of cell $C_1$ shown in FIG. 2, it will be apparent that each cell comprises a first channel 4 having at least one portion 4' (shown in broken lines) constituted of a superconductive material and having a transverse cross section which is thin relative to that of line $1_1$, such that at the temperature established by the refrigeration means, this portion 4' changes from its superconductive state to its resistive state for a critical current intensity $I_{c1}$. As is explained in the above-described European patent application, and in conformity with the graphs of FIG. 2 (where i=1 to illustrate the present example), as long as the current $I_1$ in the line $1_1$ is below $I_{c1}$, all the current flows through the channel 4 to the line 2 (see FIG. 1) common to all the cells and maintained at zero voltage. In the preferred embodiment of the invention wherein the lines $1_1$ to $1_4$ are of a superconductive material, as well as the channel 4 of each cell and its connection line to the line 2, there will be in that case no voltage between the input and the output of channel 4 and the current in the channel can vary only between zero and $I_{c1}$, the channel 4 having no resistance.

If the current $I_1 > I_{c1}$, the channel 4 changes to its resistive state and will no longer conduct current equal to $I_{c1}$, the excess $(I_1 - I_{c1})$ passing through a second conductive channel 5 of the cell, disposed in parallel with the channel 4 and comprising a portion of electrical resistance R. For topological reasons, the channel 5 can comprise a superconductive portion between an input 6 of the cell and a terminal 7 of the resistance R, this portion then remaining constantly superconductive, like the line $1_1$. It can also be omitted, as in the cell of the mentioned European patent application.

There is shown in FIG. 3 the voltage at the terminals of the resistance R, as a function of the current $I_1$ (i=1) which is the input to the cell $C_1$. This voltage is represented by a straight line of slope R, passing through the abscissa $I_{ci} = I_{c1}$, the critical current of the thin portion 4' of the superconductive channel 4.

According to the present invention, the cells of the network are partially or completely interconnected by unidirectional interconnection channels. As shown for example in FIG. 2, such a channel is constituted by a superconductive line 8 in which is mounted a voltage amplifier 9 of gain g, said line leaving the upstream terminal 6 of the resistance R to rejoin another line 10 which is also superconductive connected to the anode of a diode 11 whose cathode is connected to the line $1_4$ which is the input to the cell $C_4$, and is thus interconnected with the cell $C_1$.

Thus, a voltage v imposed on the resistance R is amplified to g.v by the amplifier 9 which induces a current in the line $1_4$ (see the graph of FIG. 3). The line $1_4$ can therefore receive, in addition to a possible control current $I_e$ from the input $E_4$, currents via its interconnections with cells of the cells $C_1$, $C_2$, $C_3$ which have switched to their "excited" state because of their supply with a current $I_i > I_{ci}$, $I_{ci}$ being adapted moreover to be particular to each cell $C_i$ (i=1 to 3).

The channel (8, 9, 10, 11) thus constitutes a "synapse" of which it is necessary to be able to adjust the synaptic load, as is well known in the art of neuronal networks.

According to an essential characteristic of the present invention, the synaptic load is adjusted by varying the current injected by the diode 11 into the line $1_4$, by voltage control means adapted to derive a variable portion of the current delivered to the diode 11 via the line 8.

These means comprise a line 12 which can be normally conductive or superconductive, in which is mounted a diode 14 passing between a terminal 15 common to the anode and the diode 11 and the line 10, and means to establish an adjustable voltage $w_{ij}$ ($w_{14}$ in the illustrated example) in the line 12.

According to the invention, the line 10 comprises, upstream of the terminal 15, a portion (shown in broken line in FIG. 2) of a section such that the voltage delivered by the amplifier 9 saturates this portion with a current of critical intensity $i_{cij}$ ($=i_{c14}$ in the illustrated example), the gain g of the amplifier being selected to ensure continuously this saturation when the cell $C_1$ is excited.

Thus the current $i_{ij}$ ($i_{i4}$ in the illustrated example) delivered by the interconnection channel of the input line $l_i$ ($l_4$ in the illustrated example) is such that:

$$i_{ij} = i_{cij} - i_w$$

where $i_w$ is the current delivered by the line 12, as a function of the voltage $w_{ij}$ established in this line by the voltage control means. The value of the current $i_{ij}$ could also be regulated to a value corresponding to a predetermined synaptic load, as will be explained in the following in connection with the graph of FIG. 4.

There is established a complete two-directional interconnection of two cells by providing two parallel interconnection channels delivering current in opposite directions between these cells. In FIG. 2, there is shown a second channel (8', 9', 10', 11', 12', 14') comprised by elements identical or similar to those of the first channel which are indicated by the same reference number. It should be noted, however, that the amplifier 9' is a negative voltage amplifier of gain −g. Moreover, the diodes 11', 14' are mounted passing in the opposite direction from that of the diodes 11, 14 of the first channel. In the second channel, the current flowing in the line 10' is saturated at a critical value $i'_{c14}$, the diode 11' deriving current from the line $l_4$ to discharge it through the line 8', via line 10'. The line 12' controls the current intensity thus derived as a function of the variable voltage $w'_{14}$ which is applied to it. The current in the portion of the line 10' which is saturated remaining constant, it will be understood that the current previously withdrawn through the line $l_4$ through the diode 11' can be adjusted as a function of the desired synaptic load.

In the network shown in FIG. 1, the cells $C_1$ to $C_4$ thus constitute "neurons" for the network output whose states are representative of the reaction of the network to a certain combination condition of the inputs $E_1$ to $E_4$. It is therefore necessary to be able to determine the condition of the output cells. More generally, a neuronal network according to the invention comprises input cells, means to excite selectively these input cells, "hidden" cells, output cells and means to determine the condition $S_i$ of the output cells. According to the invention, said determining or reading means are constituted each by a conductor such as 13 (see FIG. 2) disposed adjacent the channel 5 of the associated output cell so that a flow of current in the channel (observed when the cell is excited, which is to say supplied with a current $I_i > I_{ci}$) induces a current in the conductor, means being provided to detect this current and to derive from it information on the condition ($S_1$, $S_2$, $S_3$, $S_4$) of the cell.

According to a preferred embodiment of the invention, of particularly simple conception, the value of the resistance R of channel 5 can be the same in all the neurons. The amplifiers 9 and 9' can have an absolute gain value g which is identical for all the neurons. The synapse of neuron i toward the neuron j can have different characteristics (or identical in which case the influences are symmetrical) to the synapse of neuron j toward neuron i. The critical currents $i_{cij}$ and $i_{cij}$ can if desired be equal to a common value $i_c$.

There will now be described the operation of the neuronal network according to the present invention.

When the input line $l_i$ of a cell or a "neuron" $C_i$ is traversed by a current $I_i < I_{ci}$, all the current passes through the channel 4 of the associated cell $C_i$. No current passes in its channel 5 and the assembly of the line $l_i$ is at zero potential. The cell is in a "non-excited" state. No current passes through the synapses of this neuron because of the orientation of the diodes 11, 11', 14, 14' and because the amplifiers 9 and 9' then do not deliver any voltage, no matter what the values of the voltages $w_{ij}$ and $w'_{ij}$ for controlling the passage of current in said synapses.

If the current $I_i$ becomes greater than $I_{ci}$, it divides into two parts upon entering the cell. On the one hand a current of critical intensity $I_{ci}$ continues to pass in the channel 4 while the other part in excess of the current ($I_i - I_{ci}$) passes through the channel 5. The line $l_i$ and the channel 5 in its portion upstream of the resistance R are then maintained at a potential R ($I_i - I_{ci}$), shown in FIG. 3 and discussed above.

The amplifiers 9 and 9' then deliver voltages g.R ($I_i - I_{ci}$) and −g.R ($I_i - I_{ci}$), respectively. These voltages induce currents in the superconductive lines 8 and 8'. The voltage-current characteristics $w, w'/i_{ij}, i'_{ij}$ of the lines 10 and 10' between the lines $l_i$ and the bifurcation terminals 15 and 15' are shown in FIG. 4. As was seen above, between the lines 8 and 8' and the terminals 15 and 15' respectively, the currents are fixed at critical intensity values $i_{cij}$ and $i'_{cij}$, respectively, no matter what the voltage applied if this latter is greater than $r.i_{cij}$ where r is the resistance proper of the diodes 11, 11' under the voltage in lines 8 and 8'.

In FIG. 4, there is shown graphs of the variations of voltage w and w' as a function of the currents $i_{ij}$ and $i'_{ij}$ respectively. Designating by s the resistance proper of the diodes 14, 14' it will be seen that the values of w, w' are such that:

$$-s.i_{cij} < w < r.i_{cij}$$

$$-r.i_{cij} < w' < s.i_{cij}$$

accordingly as the current in the connection channel passes completely through the diode 11, 11', or through the diode 14, 14' of the line 12, 12' for injection or extraction of the current.

Thus, by control of the voltage w, w' the current $i_{ij}$, $i'_{ij}$ can be made to vary between 0 and an extreme value of absolute value $i_{cij}$.

Thanks to this voltage control, the current $i_{ij}, i'_{ij}$ can be made to vary with great precision, which is to say the synaptic load of the first cell or neuron toward the second cell or vice versa. It is thus known how to vary a voltage with great precision, which cannot be done with a resistance (or conductance) as was seen from the preamble of the present specification.

The voltage control means used can be constituted, by way of example, by a photodiode itself controlled with the aim of the emission of a miniature laser source. Preferably, the photodiode thus controlled may take the place of the diode 14, 14'. The present technology permits adjusting the quantity of photons emitted by the source with a precision permitting a definition of the voltage w, w' of 10 bits at least, which is quite superior to the precision sought in the present application, as was seen from the preamble of the present specification.

In FIG. 4, it will be seen that the relations connecting the voltages w,w' to the current $i_{ij}$, $i'_{ij}$ are not linear. The non-linearities observed result from the non-linear voltage/current characteristics of the diodes. The graphs of FIG. 4 correspond to a situation in which the receptor cell, in an interconnection between a cell i and a cell g, is not excited, a situation designated by the value $x_j=0$ (see FIG. 3). If on the contrary $x_j \neq 0$, there results a slight variation of the value of $i_{ij}$, $i'_{ij}$. So that this variation will remain small, it is necessary to chose R to be as small as possible so that the input voltage remains small and g as great as possible so that the voltage g.v will be sufficiently great. Calculations show that the variation observed does not modify the transitions toward 0 of the excited neurons, because the sum of all the variations received by the neuron is proportional to $(I_i - I_{ci})$.

If for a neuron $C_i$, the output 13 detects the passage of a current, the neuron is said to be "excited" and its value is $x_i = 1$. If by means of a certain number of inputs ($E_1$, ... $E_n$) there is introduced a current $I_e > I_{ci}$, the associated neurons pass initially to the condition 1. Each neuron thus receives a current:

$$I_i = \Sigma i_{ij} x_{ij} - \Sigma i'_{ij} x_j + I_e$$

$I_e$ not figuring in this formula except for the input neurons of the network. The neurons which receive a current higher than $I_c$ pass to condition 1 and discharge current in the others.

In a neuronal network with cells that are completely interconnected or not, to each assembly of inputs E of neurons excited by external application of current corresponds a condition of all the neurons and among them there exists an assembly of neurons of output S which depend on the assembly of synaptic voltages $w_{ij}$. The network according to the invention moreover functions according to known principles of analogic neuronal networks.

It will now be seen that the network according to the invention has various advantages. On the one hand, it is a neuronal network which arrives instantaneously at its equilibrium condition, without intervention of a specialized computer in the calculation of the condition of the network. There is thus available a rapid information input of least cost.

The known analogic neuronal networks do not have large memory capacity because it is not possible to adjust the synaptic load with sufficient precision. With the network according to the invention, the adjustment of the voltages $w_{ij}$ can be done with very great precision, 10 bits or more. If for example the voltage $w_{ij}$ is comprised between $-50$ mV and $+50$ mV, it suffices to be able to vary the voltage by increments of 0.1 mV to achieve a definition of 10 bits. The present technology permits varying the voltage by increments of 0.1 mV. The information input, which consists in working with certain voltages $w_{ij}$, can be effected with high speed by means of a specialized microcomputer.

Moreover, the network according to the invention is easy to produce because it can be constituted by repeating components, all the critical current intensities $I_{ci}$, $I_{cij}$, $i'_{cij}$, all the resistances r, s and R can be identical or similar, without high precision being necessary as to the values of these parameters. Microlithographic printing and deposit techniques well known in the production of integrated circuits are usable to produce the network.

As seen from the above, the network according to the invention requires the use of refrigeration means capable of maintaining the network at a temperature ensuring the constant maintenance of the superconductivity of certain lines and the possibility of commutation of other superconductive lines or of portions of these lines. One could, by way of non-limiting example, use as superconductor material, a superconductive ceramic such as YBaCuO or a metallic alloy of the type NbTi. With ceramics such as YBaCuO, there can be used as refrigeration means cryostats supplied with liquid nitrogen or small refrigerators which can provide several watts at 77° K.

By way of example, the critical intensities could be of the order of 1 mA which corresponds to a superconductive line of transverse cross section of 2 $\mu$m x 0.5 $\mu$m in a superconductive material of critical intensity of $10^5$ A/cm$^2$. The gain g can be of the order of 100 and the resistance R of the order of 1 $\Omega$. If moreover $r = s = 500$ $\Omega$ for w = 50 mV, it follows that:

$$i_{cij} = i'_{cij} = w_{max}/S_{min} = 0.1 \ mA$$

The power dissipated by a network of 1000 identical neurons completely interconnected is of the order of 6 W, the power being principally dissipated in the synapses and in the amplifiers of the active neurons.

Upon adding insulation losses, the losses in the output detectors and the thermal conductions toward the external controls, the total power dissipated can reach 7 W, which corresponds to a consumption of the order of 700 W of electricity for a cold temperature refrigerator of 77° K. So that this loss will be as low as possible, it is necessary that the critical intensities be low as well as the resistances of the diodes themselves, so as to keep the voltages, w,w' as low as possible while maintaining good precision of these latter.

In the case of failure of the refrigeration, the network stops operating but does not suffer damage nor any abnormal heating because the synapses and the superconductive lines then become totally insulating.

What is claimed is:

1. An analogic neuronal network comprised of at least a first and a second cell, each cell comprising;
    a first channel (4,4') comprised of a material having selectively a superconductive state and a resistive state; p1 a refrigeration means to maintain said first channel at a temperature below that which ensures superconductivity of the material below a critical current intensity in said first channel,
    a second channel (5) coupled to the first channel at one end of said second channel to form an input node, and the other end of said second channel coupled to an electrical resistance (R) to form an output node;
    a first interconnection channel (8,9,10,11,14, 8',9',10',11',14') which couples the output node of said at least first cell to the input node of said at least second cell, said first interconnection channel injecting a first current into said at least first cell from said at least second cell, and said first interconnection channel having a first voltage controlled means ($w_{ij}, w'_{ij}$) which adjusts the intensity of said first current.

2. A neuronal network according to claim 1, which comprises a second interconnection channel (8,9,10,11,14,8',9',10',11',14') which couples the output node of said at least first cell to the input node of said at least second cell, said second interconnection channel extracting a second current from said at least first cell, and said second interconnection channel having a second voltage controlled means ($w_{ij}, w'_{ij}$) which adjusts the intensity of said second current; and said first and second interconnection channels also contain unidirectional conduction elements, said interconnection channels conducting current in opposite directions with respect to each other.

3. A neuronal network according to claim 2, wherein said unidirectional conduction means are diodes (11,11').

4. A neuronal network according to claim 2, wherein said first interconnection channel is coupled to said first output node via a positive voltage amplifier (9) and said second interconnection channel is coupled to said first output node via a negative voltage amplifier (9').

5. A neuronal network according to claim 2, wherein said first interconnection further comprises a superconductive portion (10) dimensioned so as to transmit a current of critical intensity dependent upon the current supplied to said first interconnection channel and the temperature of said first interconnection channel, said superconductive portion coupled between said output node of said at least first cell and said diode, said po.

6. A neuronal network according to claim 5, wherein the first voltage control means comprise a line (12) connected to the node formed at the point of interconnection of the diode and the superconductive portion, said line extracting a current of predetermined intensity so as to adjust the intensity of said first current.

7. A neuronal network according to claim 6, wherein said first voltage control means comprise a diode (14) coupled to said line (12).

8. A neuronal network according to claim 7, wherein said diode of said first voltage control means is a photodiode, and said first voltage control means is further comprised of a light emission means to control said photodiode.

9. A neuronal network according to claim 8, wherein said light emission means is a laser emission means.

10. A neuronal network according to claim 1, wherein said at least first and second cells are output cells, wherein said at least first and second cells are further comprised of a reading means, said reading means being comprised of a conductor (13) disposed adjacent said second channel such that a current flowing in said second channel induces a current in said conductor (13).

11. A neuronal network according to claim 10, wherein said material is a superconductive ceramic.

12. A neuronal network according to claim 11, wherein said ceramic material is YBaCuO.

13. A neuronal network according to claim 10, wherein said material a metallic alloy.

* * * * *